(12) United States Patent
Reed et al.

(10) Patent No.: US 7,836,989 B2
(45) Date of Patent: Nov. 23, 2010

(54) BATTERY BOXES AND VEHICLES INCLUDING SAME

(75) Inventors: Camas Reed, Columbus, OH (US); Ryan J. Holoweiko, Raymond, OH (US)

(73) Assignee: Honda Motor Company, Ltd., Tokyo (JP)

( * ) Notice: Subject to any disclaimer, the term of this patent is extended or adjusted under 35 U.S.C. 154(b) by 717 days.

(21) Appl. No.: 11/821,965

(22) Filed: Jun. 26, 2007

(65) Prior Publication Data
US 2009/0004554 A1 Jan. 1, 2009

(51) Int. Cl.
*B60R 16/04* (2006.01)

(52) U.S. Cl. ............................ 180/68.5; 307/10.7
(58) Field of Classification Search ............... 180/68.5; 429/48, 100, 121, 163, 176, 179; 307/10.7
See application file for complete search history.

(56) References Cited

U.S. PATENT DOCUMENTS

| | | | |
|---|---|---|---|
| 1,607,598 A | 11/1926 | Andrews | |
| 2,913,587 A | 11/1959 | Gebhard | |
| 3,691,668 A * | 9/1972 | Strebig | 43/19.2 |
| 4,321,522 A | 3/1982 | Matsunaga | |
| 4,854,540 A | 8/1989 | Balek | |
| 5,293,951 A | 3/1994 | Scott | |
| 5,301,765 A | 4/1994 | Swanson | |
| 5,378,555 A | 1/1995 | Waters et al. | |
| 5,477,936 A | 12/1995 | Sugioka et al. | |
| 5,547,036 A | 8/1996 | Gawaskar et al. | |
| 5,636,701 A | 6/1997 | Norman et al. | |
| 5,709,280 A | 1/1998 | Beckley et al. | |
| 5,756,227 A | 5/1998 | Suzuki et al. | |
| 5,789,898 A | 8/1998 | Suzuki et al. | |
| 6,111,327 A * | 8/2000 | Bae | 307/10.7 |
| 6,439,329 B1 * | 8/2002 | Vaishnav et al. | 180/68.5 |
| 6,564,893 B2 | 5/2003 | Lipman | |
| D495,994 S | 9/2004 | Arakelian | |
| 6,842,633 B1 * | 1/2005 | Deo et al. | 455/575.8 |
| 7,126,311 B2 | 10/2006 | Gottsponer et al. | |
| 2003/0047366 A1 | 3/2003 | Andrew et al. | |
| 2003/0121191 A1 * | 7/2003 | DeJarnette et al. | 40/576 |
| 2004/0065491 A1 | 4/2004 | Dudley et al. | |

OTHER PUBLICATIONS

John Daniel Walters, Official Action and PTO-892, Notification date of Jun. 24, 2009, U.S. Appl. No. 11/821,966, Titled: Battery Boxes Having Aperture and Vehicles Including Same, Filed: Jun. 26, 2007, Inventor: Camas Reed et al., 7 pages.

(Continued)

*Primary Examiner*—J. Allen Shriver, II
*Assistant Examiner*—Jacob Meyer
(74) *Attorney, Agent, or Firm*—Ulmer & Berne LLP

(57) ABSTRACT

Vehicles, such as all terrain vehicles, can be provided with a battery box. The battery box comprises a bottom wall, a top wall, a first side wall, and a second side wall which together define a battery retention chamber having a front opening configured for passage of a battery. Vehicles having a battery box are also provided.

25 Claims, 6 Drawing Sheets

OTHER PUBLICATIONS

U.S. Appl. No. 11/821,966, Titled: Battery Boxes Having Aperture and Vehicles Including Same, Filed Jun. 26, 2007, Inventors: Camas Reed et al., in its entirety.

John Daniel Walters, Official Action, PTO-892, and related documents, Notification date of Jan. 8, 2010, U.S. Appl. No. 11/821,966, Titled Battery Boxes Having Aperture and Vehicles Including Same, Filed: Jun. 26, 2007, Inventor: Camas Reed et al., 14 pages.

John Daniel Walters, Advisory Action and related documents, Notification date of Mar. 11, 2010, U.S. Appl. No. 11/821,966, Titled: Battery Boxes Having Aperture and Vehicles Including Same, Filed: Jun. 26, 2007, Inventor: Camas Reed et al., 5 pages.

John Daniel Walters, Notice of Allowance and Fee(s) Due having a Notification of Jul. 21, 2010, for U.S. Appl. No. 11/821,966, Titled: Battery Boxes Having Aperture and Vehicles Including Same, Filed Jun. 26, 2007, Camas Reed, et al., in its entirety (13 pages).

* cited by examiner

BATTERY BOXES AND VEHICLES INCLUDING SAME

REFERENCE TO RELATED APPLICATION

The present application is related to U.S. patent application Ser. No. 11/821,966, filed on Jun. 26, 2007, and entitled "Battery Boxes Having Aperture And Vehicles Including Same", the entirety of which is hereby incorporated herein by reference.

TECHNICAL FIELD

The present invention relates to vehicles and battery boxes for vehicles such as, for example, all terrain vehicles ("ATVs").

BACKGROUND

A conventional ATV includes a battery box 118 which is formed from plastic and is mounted (e.g., with bolts) to a vehicular frame 116 at a location beneath a rear fender of the ATV, as shown in FIG. 6. The battery box 118 includes a bottom wall 120, a top wall 122, side walls 124, 126, and a rear wall 128 which cooperate to together define a battery retention chamber 130 having a front opening 132 configured for passage of a battery. The battery box 118 also includes a retention member 150 which facilitates selective securement of a battery within the battery retention chamber 130. A drain hole 196 is provided in the bottom wall 120. The top and rear walls 122, 128 of the battery box 118 define an aperture 148 which is configured to facilitate passage of a tool for accessing a bolt used to secure the bottom wall 120 of the battery box 118 to the frame 116. When a battery is disposed within the battery retention chamber 130, an operator's finger can pass through a cutout 147 in the side wall 124 and can press against a left side surface of the battery for removing the battery from the battery retention chamber 130. A right side surface of the battery may be simultaneously contacted by another of the operator's fingers to facilitate removal of the battery from within the battery retention chamber 130.

The rear wall 128 of the battery box 118 includes an extension 129 from which two prongs 134, 136 extend generally parallel with the side wall 124. The prongs 134, 136 are configured to receive channels of a solenoid for mounting of the solenoid to the extension 129. The prongs 134, 136 each include respective vertical projections 142, 143 which help to prevent the solenoid from inadvertently sliding off from the prongs 134, 136. Once a solenoid is attached to the prongs 134, 136, a flexible rubber cover is attached to cover the solenoid.

SUMMARY OF THE INVENTION

In accordance with one embodiment, a vehicle comprises a frame, a battery, and a battery box. The battery has a generally rectangular shape and comprises a first side surface and a second side surface. The first side surface is generally parallel with the second side surface. The battery box is attached to the frame and comprises a bottom wall, a top wall spaced from the bottom wall, a first side wall, and a second side wall. The first side wall extends from the bottom wall to the top wall. The second side wall is spaced from the first side wall and extends from the bottom wall to the top wall. The bottom wall, the top wall, the first side wall, and the second side wall together define a battery retention chamber having a front opening configured for passage of the battery. The battery is disposed at least partially within the battery retention chamber. The first side wall is adjacent to the first side surface of the battery. The second side wall is adjacent to the second side surface of the battery. The top wall defines at least a portion of an aperture configured to facilitate passage of at least one finger of an operator for contacting and pushing the battery such that at least a portion of the battery passes from within the battery retention chamber and through the opening.

In accordance with another embodiment, an all terrain vehicle comprises a frame, a battery, a battery box, a solenoid, and a cover. The battery has a generally rectangular shape and comprises a first side surface and a second side surface. The first side surface is generally parallel with the second side surface. The battery box is attached to the frame and comprises a bottom wall, a top wall spaced from the bottom wall, a first side wall, a second side wall, and a retention member. The first side wall extends from the bottom wall to the top wall. The second side wall is spaced from the first side wall and extends from the bottom wall to the top wall. The retention member is configured for selective attachment to at least one of the bottom wall, the top wall, the first side wall, and the second side wall to facilitate selective securement of the battery. The bottom wall, the top wall, the first side wall, and the second side wall together define a battery retention chamber having a front opening configured for passage of the battery. The battery is disposed at least partially within the battery retention chamber. The first side wall is adjacent to the first side surface of the battery. The second side wall is adjacent to the second side surface of the battery. The top wall defines at least a portion of an aperture adjacent to the first side wall and sized to accommodate simultaneous passage of at least two fingers of an operator for contacting and pushing the battery such that at least a portion of the battery passes from within the battery retention chamber and through the opening. The solenoid is attached to the first side wall of the battery box. The cover is attached to the first side wall of the battery box and is configured for covering the solenoid.

In accordance with yet another embodiment, a battery box comprises a bottom wall, a top wall spaced from the bottom wall, a first side wall, and a second side wall. The first side wall extends from the bottom wall to the top wall. The second side wall is spaced from the first side wall and extends from the bottom wall to the top wall. The bottom wall, the top wall, the first side wall, and the second side wall together define a battery retention chamber having a front opening configured for passage of a battery. The top wall defines at least a portion of an aperture configured to facilitate passage of at least one finger of an operator for contacting and pushing a battery such that at least a portion of a battery passes from within the battery retention chamber and through the opening.

In accordance with yet another embodiment, a battery box comprises a bottom wall, a top wall, a first side wall, a second side wall, a rear wall, a first prong, and a second prong. The top wall is generally parallel with the bottom wall and is spaced from the bottom wall. The first side wall extends from the bottom wall to the top wall. The second side wall is generally parallel with the first side wall, is spaced from the first side wall, and extends from the bottom wall to the top wall. The rear wall extends from the bottom wall to the top wall and extends from the first side wall to the second side wall. The bottom wall, the top wall, the first side wall, the second side wall, and the rear wall together define a battery retention chamber having a front opening configured for passage of a battery. The first prong and the second prong each extend generally perpendicularly from the first side wall opposite the battery retention chamber. The first prong is spaced from the second prong in a generally parallel and corresponding relationship. The first prong and the second prong are together configured to slidably receive a solenoid.

In accordance with still another embodiment, a battery box comprises a bottom wall, a top wall, a first side wall, a second side wall, a first prong, and a second prong. The top wall is spaced from the bottom wall. The first side wall extends from the bottom wall to the top wall. The second side wall is spaced from the first side wall and extends from the bottom wall to the top wall. The bottom wall, the top wall, the first side wall, and the second side wall together define a battery retention chamber having a front opening configured for passage of a battery. The first prong and the second prong each extend laterally from the first side wall. The first prong is spaced from the second prong. The first prong and the second prong are together configured to slidably receive an electrical actuator.

In accordance with yet another embodiment, a vehicle comprises a frame, a battery, an electrical actuator, and a battery box. The electrical actuator has a first mounting provision and a second mounting provision. The battery box is attached to the frame and comprises a bottom wall, a top wall, a first side wall, a second side wall, a first prong, a second prong, and a retention member. The top wall is spaced from the bottom wall. The first side wall extends from the bottom wall to the top wall. The second side wall is spaced from the first side wall and extends from the bottom wall to the top wall. The bottom wall, the top wall, the first side wall, and the second side wall together define a battery retention chamber having a front opening configured for passage of the battery. The first prong and the second prong each extend laterally from the first side wall opposite the battery retention chamber. The first prong is spaced from the second prong. The first prong and the second prong respectively interface the first mounting provision and the second mounting provision of the electrical actuator to facilitate attachment of the electrical actuator to the battery box. The retention member is configured to facilitate selective securement of the battery within the battery retention chamber.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Embodiments are hereinafter described in detail in connection with the views and examples of FIGS. 1-5, wherein like numbers may indicate the same or corresponding elements throughout the views. Certain embodiments will be described herein with reference to an ATV. It will be appreciated that an ATV can comprise a saddle-type vehicle suitable for off-road sport and/or utility use by a driver and perhaps one or more passengers. Although examples provided herein relate to an ATV, it will be appreciated that certain embodiments may also have applicability to other types of vehicles such as, for example, automobiles, trucks, vans, personal watercraft, aircraft, motorcycles, boats, toys, and construction equipment, for example.

Figure 1:
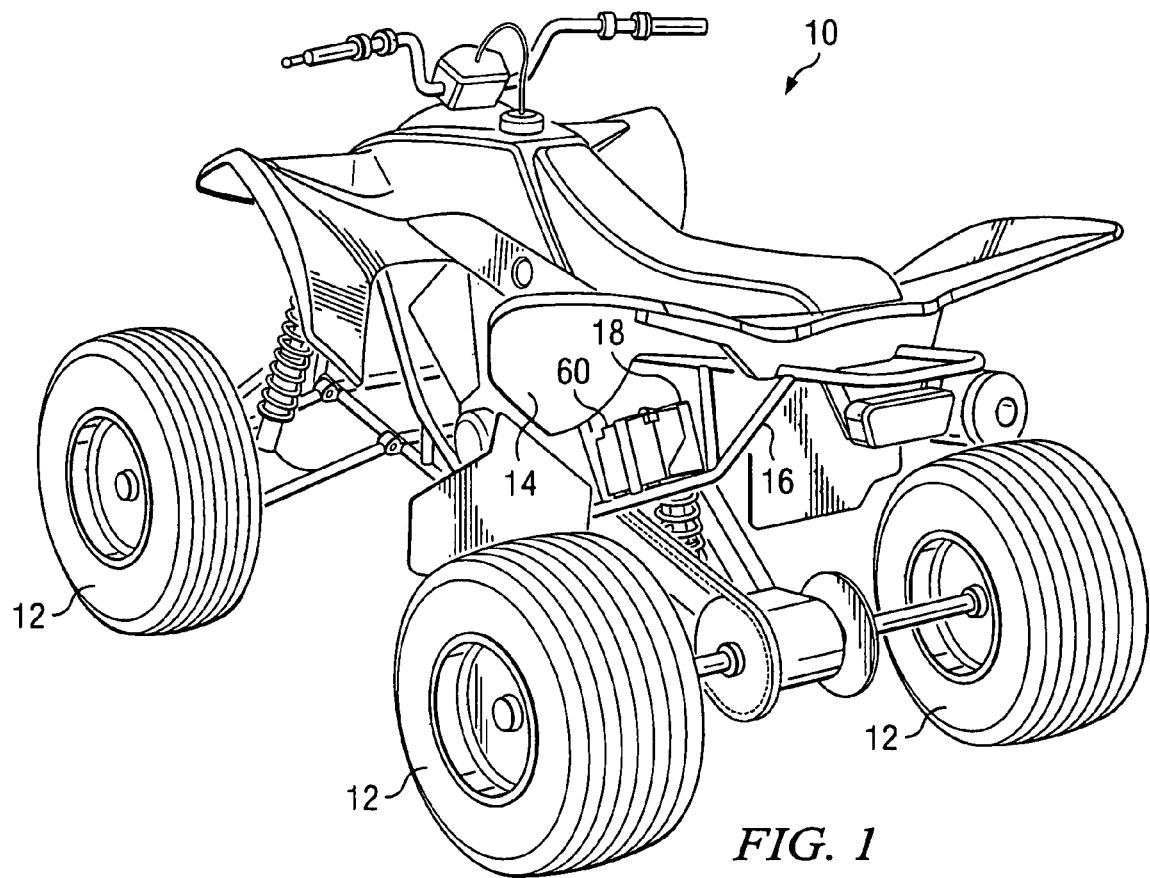
FIG. 1 is a rear perspective view depicting an ATV in accordance with one embodiment.

In one embodiment, as depicted in FIG. 1, for example, an ATV 10 can comprise wheels 12 supported with respect to a frame 16 of the ATV 10. While the ATV 10 is shown to be of a type having four wheels 12, it will be appreciated that, in alternative embodiments, an ATV can have a differing numbers of wheels. The ATV 10 is also shown to include a fender assembly including a rear fender 14. The fender assembly can be configured to prevent debris from being thrown from the ATV's wheels and upon an operator and/or passenger(s) of an ATV during travel of the ATV. Such debris might include, for example, dirt, brush, rocks, or moisture. The rear fender 14 can be directly or indirectly attached to the frame 16 of the ATV 10.

As shown in FIGS. 2-5, the ATV 10 can include a battery box 18 which includes a bottom wall 20, a top wall 22, side walls 24, 26, and a rear wall 28 which can all cooperate to together define a battery retention chamber 30 having a front opening 32. The front opening 32 can be configured to facilitate passage of a battery (e.g., 60 in FIGS. 3-4) into and out from the battery retention chamber 30 such as when the battery is installed or removed from the battery box 18. In one embodiment, as shown in FIGS. 1-5, the top wall 22 can be generally parallel with the bottom wall 20 and can be spaced from the bottom wall 20. As also shown in FIGS. 1-5, the side walls 24, 26 can be generally parallel with one another and spaced from one another, and can each extend from the bottom wall 20 to the top wall 22. The rear wall 28 is shown to extend from the bottom wall 20 to the top wall 22 and to extend from the side wall 24 to the side wall 26. It will be appreciated, however, that a battery box can alternatively be provided having walls in any of a variety of other suitable arrangements.

One or more drain holes (e.g., 96, 98) might be provided in the bottom wall 20 and/or the side walls 24, 26 to facilitate escape of any moisture which might access the battery retention chamber 30. For example, it can be seen in FIG. 5 that the drain hole 98 can be positioned near a left lower portion of the battery box 18 which, during normal use of the ATV 10, is adjacent to the lowermost portion of the battery retention chamber 30 of the battery box 18. Accordingly, any moisture that enters the battery retention chamber 30 is likely to flow to the drain hole 98, and then through the drain hole 98, for passage from the battery box 18.

Figure 2:
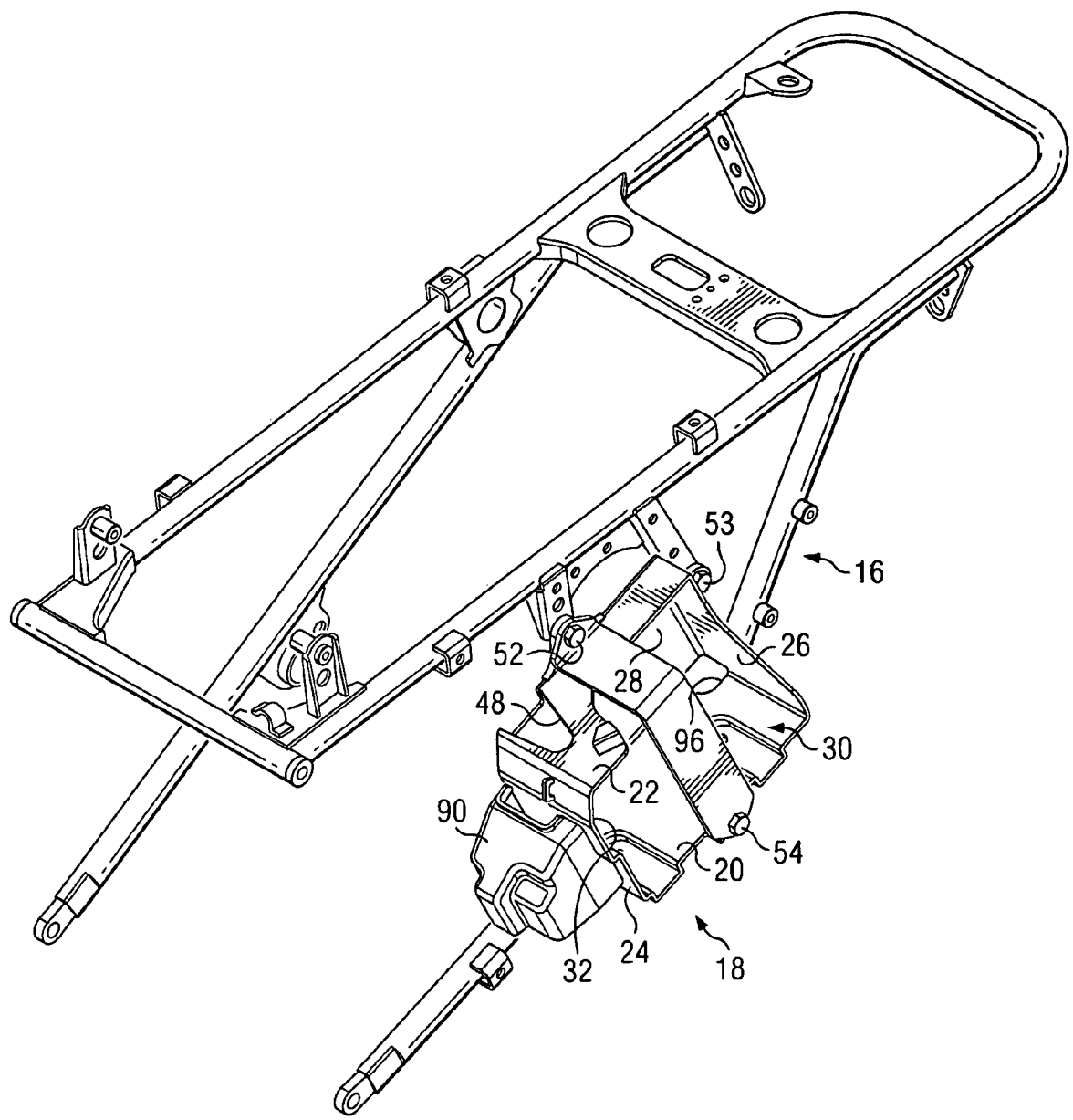
FIG. 2 is a front perspective view depicting a portion of the frame, the battery box, and the cover of the ATV of FIG. 1 apart from the remaining components of the ATV.
Figure 3:
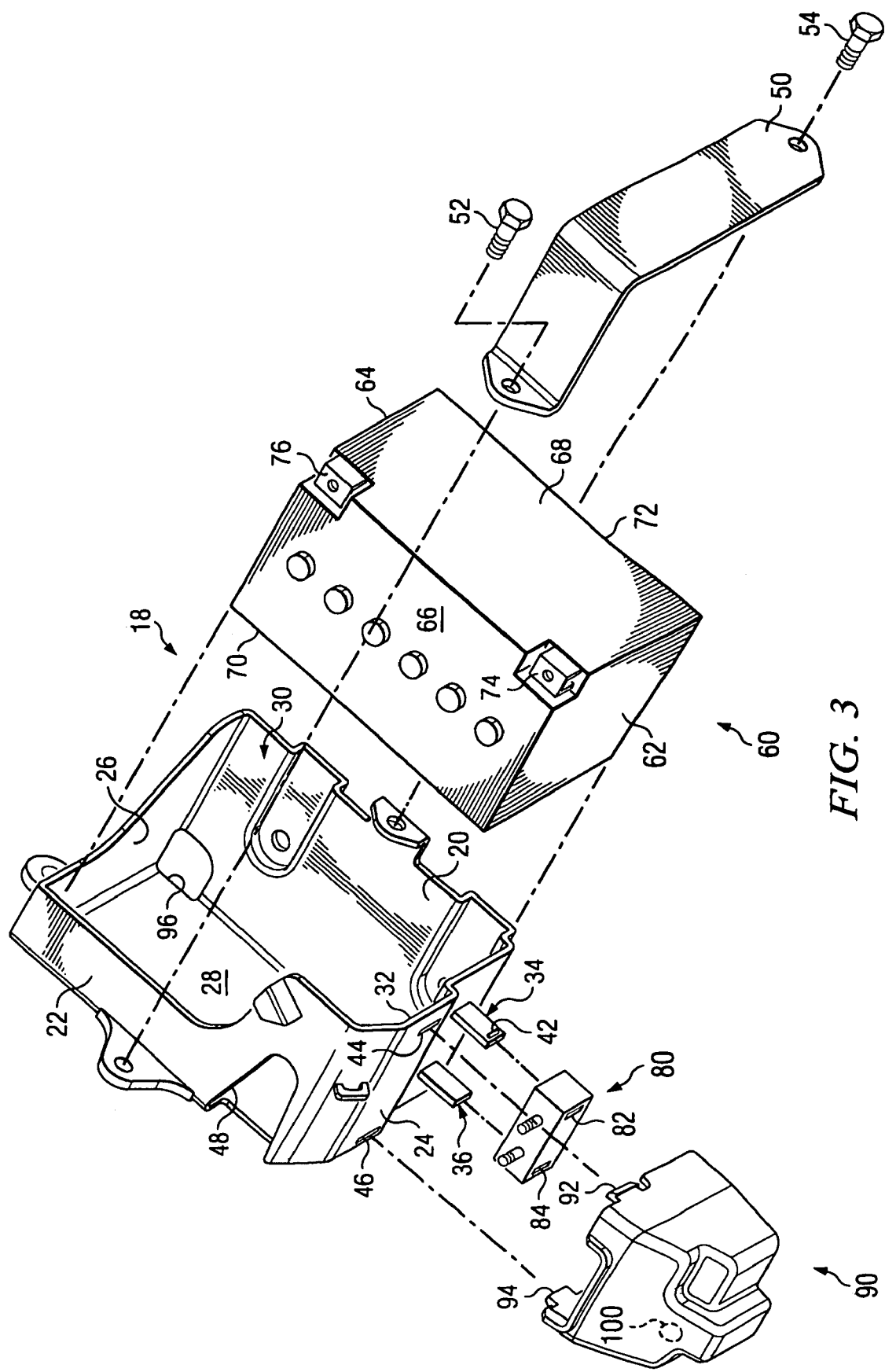
FIG. 3 is an exploded front perspective view depicting the battery box and cover apart from the frame components of FIG. 2 and in association with a solenoid and a battery.
Figure 5:
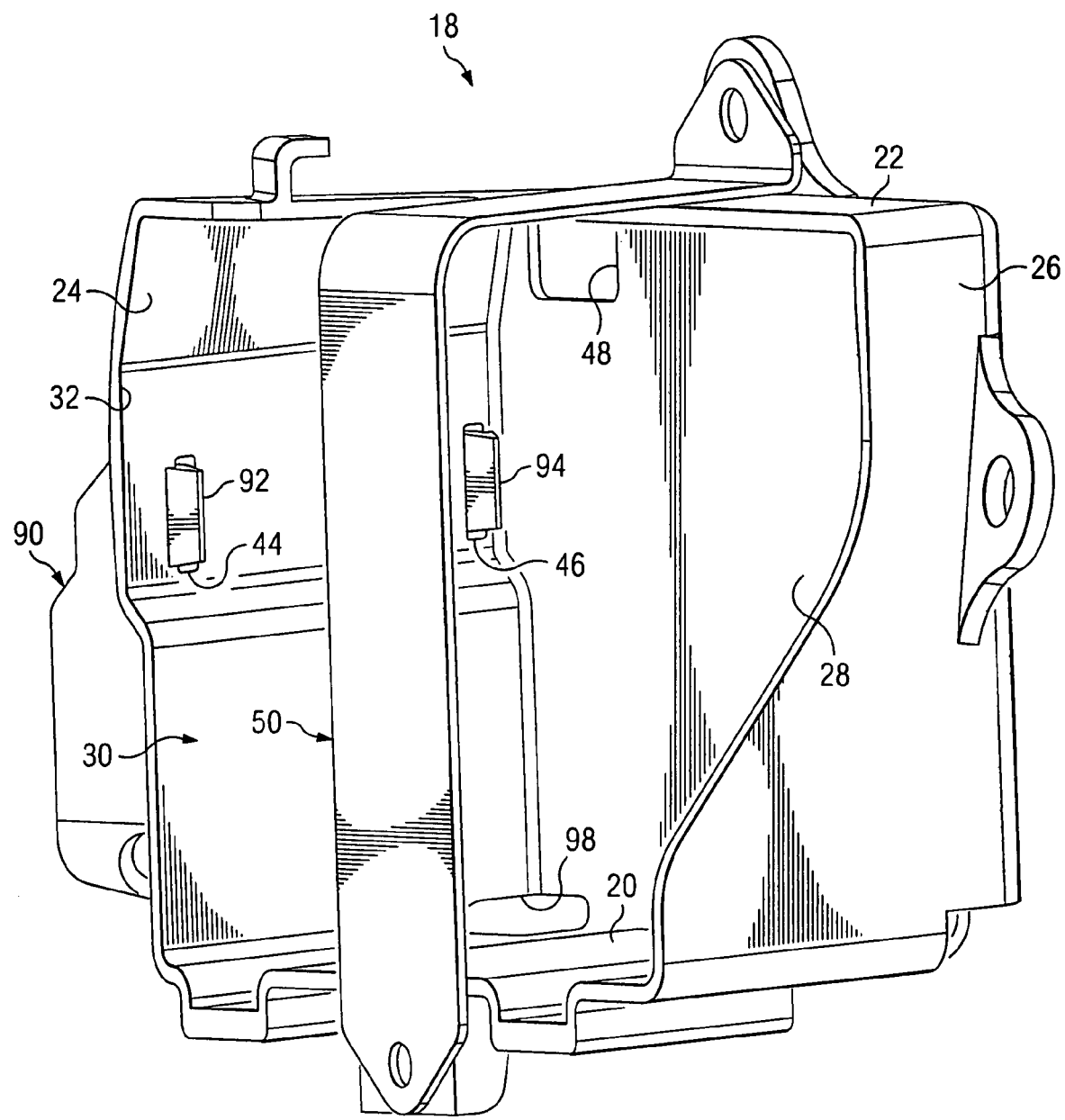
FIG. 5 is a rear perspective view depicting the battery box and the cover of FIG. 3.

The battery box 18 can also include a retention member which can be configured for selective attachment to at least one of the bottom wall 20, the top wall 22, the side wall 24, the side wall 26, and the rear wall 28 to facilitate selective securement of the battery 60 within the battery retention chamber 30. The retention member can be movable between opened and closed positions (e.g., shown in FIGS. 3 and 2, respectively) to facilitate selective installation, removal, and securement of the battery 60 within the battery retention chamber 30. For example, as shown in FIGS. 2-3 and 5, the retention member can comprise a strap 50 which can be bolted (e.g., with bolts 52 and 54 in FIG. 3) to other portions of the battery box 18, such as to the bottom wall 20 and the rear wall 28, as shown. The strap 50 can be flexible or rigid and can be formed from any of a variety of materials such as, for example, plastic, metal, or fabric. It will be appreciated that a retention member may be provided in any of a variety of alternative configurations, and may be attached to the remainder of a battery box in any of a variety of alternative arrangements.

The battery box 18 is shown in FIG. 2 as being attached to the frame 16 of the ATV 10 such as with bolts 52 and 53, for example. In one embodiment, as shown in FIG. 1, for example, the battery box 18 can be attached to the frame 16 such that the rear fender 14 covers the top wall 22 of the battery box 18 (e.g., to help in preventing debris from falling onto the battery box 18). However, it will be appreciated that a battery box may be attached to a vehicle's frame or other vehicle component in any of a variety of other suitable locations and/or configurations.

Figure 4:
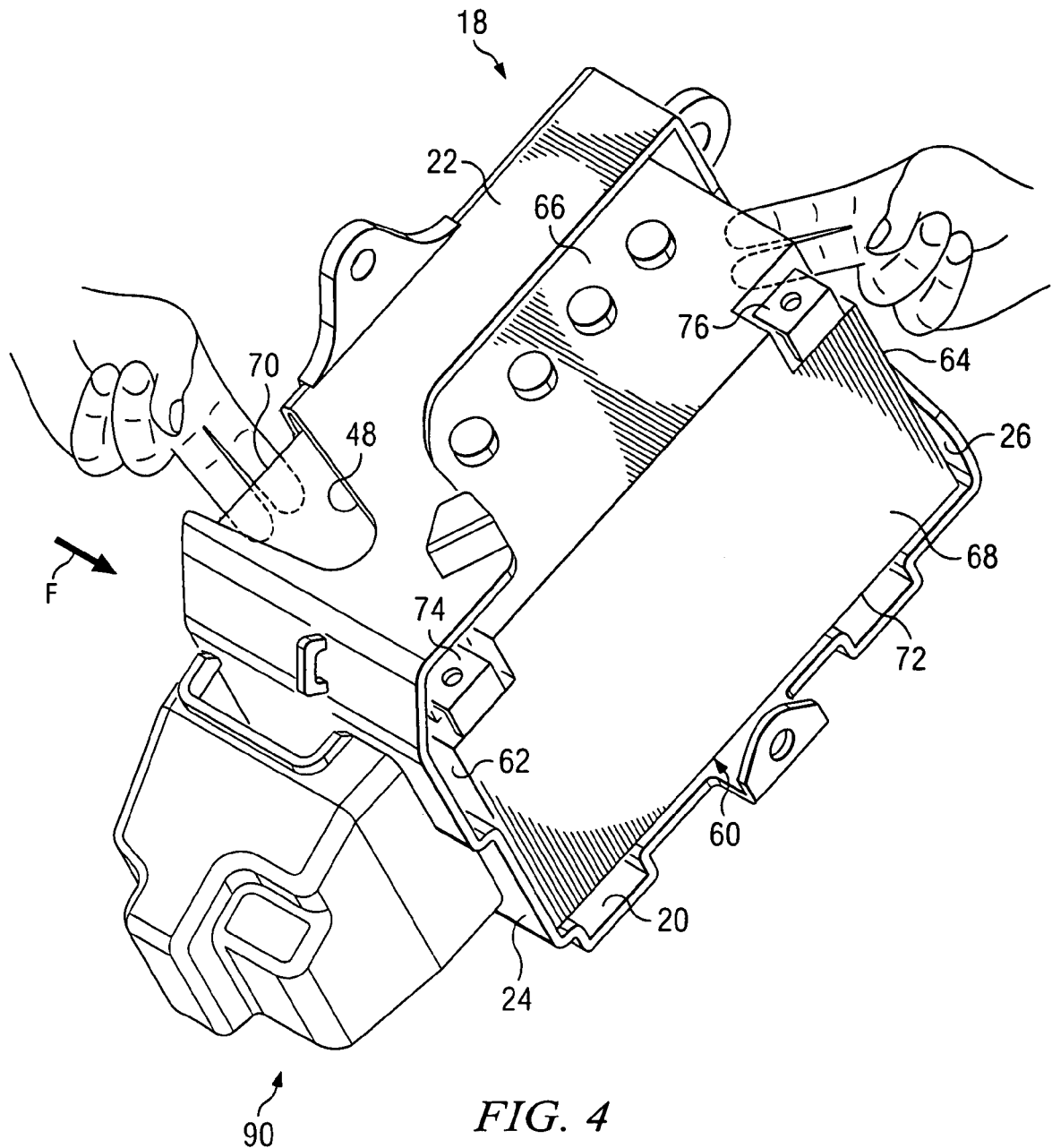
FIG. 4 is front perspective view depicting the battery box, the cover, and the battery of FIG. 3, wherein the battery is disposed within the battery retention chamber, the cover is attached to the battery box, the retention member is removed and not shown, and an operator's fingers are depicted as being positioned for removing the battery from the battery retention chamber.

The battery 60 can be selectively disposed at least partially within the battery retention chamber 30 as shown, for example, in FIG. 4. The battery 60 can have a generally rectangular shape and can have side surfaces 62, 64, a top surface 66, a front surface 68, a rear surface 70, and a bottom surface 72. The battery 60 can also be provided with lugs 74, 76 to facilitate an electrical connection to the battery 60. In one embodiment, as shown in FIGS. 3-4, the side surfaces 62, 64 of the battery 60 can be generally parallel with one another, the front and rear surfaces 68, 70 of the battery 60 can be generally parallel with one another, and the top and bottom surfaces 66, 72 of the battery 60 can be generally parallel with one another.

When the battery 60 is disposed within the battery retention chamber 30, as shown in FIG. 4, the side wall 24 of the battery box 18 can be adjacent to the side surface 62 of the battery 60, the side wall 26 of the battery box 18 can be adjacent to the side surface 64 of the battery 60, the top wall 22 of the battery box 18 can be adjacent to the top surface 66 of the battery 60, the rear wall 28 of the battery box 18 can be adjacent to the rear surface 70 of the battery 60, and the bottom wall 20 of the battery box 18 can be adjacent to a bottom surface 72 of the battery 60. In one embodiment, as shown in FIG. 4, at least part of the bottom surface 72 of the battery 60 can rest upon the bottom wall 20 of the battery box 18. When the battery 60 is fully disposed or seated within the battery retention chamber 30 (as shown in FIG. 4), the strap 50 (see FIG. 3) can be attached to the remainder of the battery box 18 such that it contacts at least the front surface 68 of the battery 60 and compresses the battery 60 within the battery retention chamber 30. In this arrangement, the strap 50 can prevent the battery 60 from becoming inadvertently dislodged from the battery box 18 during motion of the ATV 10.

The battery box 18 is shown in FIG. 3 to comprise first and second prongs 34, 36 which each extend laterally and generally perpendicularly from the side wall 24 and in a direction opposite the battery retention chamber 30. The first prong 34 is shown to be spaced from the second prong 36 in a generally parallel and corresponding relationship. Each of the first and second prongs 34, 36 are shown to extend from respective proximal ends to respective distal ends. The proximal ends of each of the first and second prongs 34, 36 are shown to be adjacent to the side wall 24. The first prong 34 can comprise one or more lateral projections (e.g., 42) adjacent to its distal end. The second prong 36 may similarly comprise one or more lateral projections adjacent to its distal end. In one embodiment, each of the bottom wall 20, the top wall 22, the side walls 24, 26, the rear wall 28, and the first and second prongs 34, 36 can be integrally formed from plastic (e.g., polypropylene), such as in an injection molding process.

Figure 6:
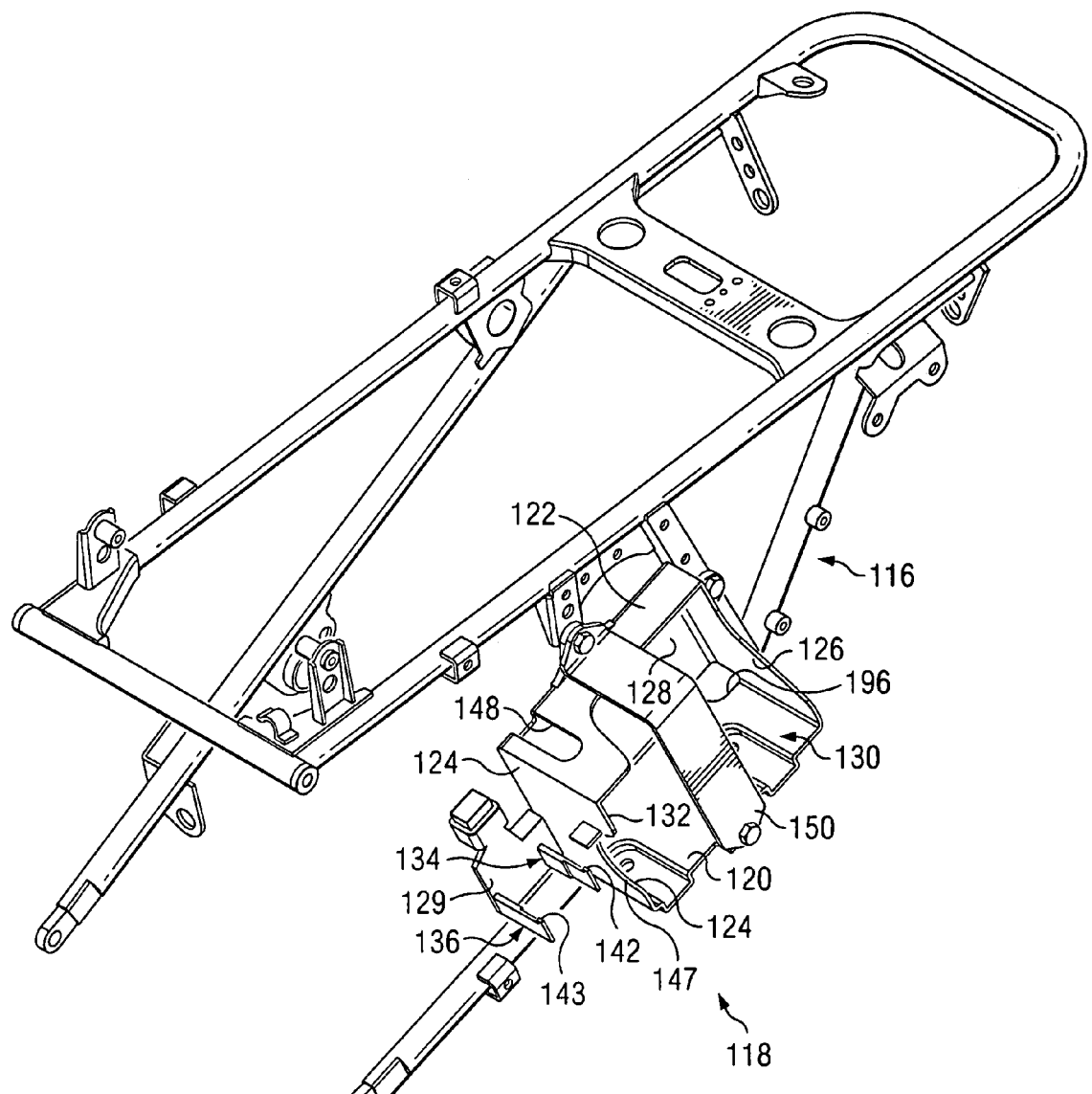
FIG. 6 is a front perspective view depicting a conventional arrangement including a portion of an ATV's frame in association with a battery box.

The first and second prongs 34, 36 can together be configured to slidably receive an electrical actuator to facilitate mounting of the electrical actuator to the side wall 24 of the battery box 18. An electrical actuator can comprise a device for use in selectively facilitating passage of electrical power from the battery 60 to an electric starter motor on the ATV 10. Such devices can include a solenoid, a solid-state switching device, or some other device. For example, the electrical actuator is shown in FIG. 3 to comprise a solenoid 80. In one embodiment, the solenoid 80 can be provided with a rubberized outer shell having mounting provisions (e.g., channels 82, 84). The first and second prongs 34, 36 of the battery box 18 can respectively interface the channels 82, 84 in the solenoid 80 to facilitate attachment of the solenoid 80 to the battery box 18. Once the channels 82, 84 of the solenoid 80 are slid over the first and second prongs 34, 36, the lateral projections (e.g., 42) on the distal ends of the first and second prongs 34, 36 can prevent the solenoid 80 from inadvertently sliding off from the prongs 34, 36. It will be appreciated that a prong having one or more lateral projections (e.g., as depicted in FIG. 3) is advantageous over a prong having one or more vertical projections (e.g., as depicted in FIG. 6) as, while both types of projections effectively prevent inadvertent removal of a solenoid, lateral projections facilitate much easier removal of a solenoid for maintenance and replacement purposes than do vertical projections.

A cover 90 can be provided for selective attachment to the side wall 24 of the battery box 18. The cover 90 can include tabs 92, 94 which can selectively interface slots 44, 46 in the side wall 24 to facilitate attachment of the cover 90 to the side wall 24. However, it will be appreciated that a cover might attach to a side wall or another portion of a battery box in any of a variety of other suitable configurations which may, for example, involve tabs, fasteners, adhesives, and/or some other mechanical feature(s). The cover 90 can be cup-shaped (e.g., as shown in FIG. 3) such that, when the cover 90 is attached to the side wall 24, it can at least partially cover the first prong 34, the second prong 36, and the solenoid 80 (when the solenoid 80 is attached to the first prong 34 and the second prong 36). In this configuration, it will be appreciated that the cover 90 can protect the solenoid 80 and at least some associated wiring from exposure to debris and potential resultant damage. While the cover 90 is shown to be formed from rigid plastic (e.g., injection molded from polypropylene), it will be appreciated that the cover 90 might alternatively be formed from some other material or combination thereof. The cover 90 can be formed to have any of a variety of features and configurations. For example, at least one drain hole (e.g., 100 shown in FIG. 3) might be provided in a bottom wall portion of the cover 90 to facilitate escape of any moisture which might otherwise accumulate within the cover 90. It will be appreciated that the drain hole 100 can be positioned such that it is located substantially at the lowermost portion of the cover 90 when the ATV 10 sits upon level ground.

As the first and second prongs 34, 36 extend from the side wall 24, and the cover 90 attaches to the side wall 24, it can be seen in FIG. 4, for example, that the side wall 24 might not include a cutout or other provision which would allow access by an operator's finger(s) to the side surface 62 of the battery 60. Accordingly, when the battery 60 is disposed within the battery retention chamber 30, as shown in FIG. 4, it can be seen that the side wall 24 of the battery box 18 at least substantially (e.g., substantially or entirely) covers the side surface 62 of the battery 60 such that an operator's finger(s) cannot effectively press against the side surface 62 of the battery 60 for removing the battery 60 from the battery retention chamber 30. Unlike the side wall 24, the side wall 26 is shown to only partially cover the side surface 64 of the battery 60 such that the side surface 64 of the battery 60 may be contacted by an operator's finger(s) to facilitate pushing of the battery 60 from within the battery retention chamber 30 and through the opening 32.

In order to facilitate simple removal of the battery from the battery retention chamber 30 despite the inaccessibility of an operator's finger(s) to the side surface 62 of the battery 60, the top wall 22 of the battery box 18 is shown to define a portion of an aperture 48 which can be configured to facilitate passage of at least one finger of an operator for contacting and pushing the battery 60 such that at least a portion of the battery 60 passes from within the battery retention chamber 30 and through the opening 32 (e.g., in a direction "F" as shown in FIG. 4). The rear wall 28 is also shown to define a portion of the aperture 48. However, in an alternative embodiment, the aperture might be entirely defined by a single wall (e.g., a top wall or a rear wall) of a battery box.

In one embodiment, the aperture 48 can be sized to accommodate simultaneous passage of at least two fingers of an operator for this same purpose. The aperture 48 is shown to be provided adjacent to the side wall 24 of the battery box 18 such that an operator may use fingers of one hand (e.g., a left hand) to contact a left portion of the battery 60 (e.g., a portion of the rear surface 70) while simultaneously using fingers of another hand (e.g., a right hand) for contacting a right portion of the battery 60 (e.g., a portion of the side surface 64), as shown in FIG. 4, for contacting and pushing the battery 60 from within the battery retention chamber 30. Accordingly, once the strap 50 is removed, through use of both hands, an operator may easily remove the battery 60 from within the battery retention chamber 30 of the battery box 18.

By providing the first and second prongs 34, 36 to extend laterally from the side wall 24 as shown in FIG. 3, it will be appreciated that the solenoid 80 mounted thereon can be exposed to less vibration than it would experience if it were mounted to prongs arranged in the conventional configuration shown in FIG. 6. As such, the useful life of the solenoid 80 can be extended through use of the configuration shown in FIG. 3. Additionally, it will be appreciated that protecting the solenoid 80 from debris can be more effectively and efficiently achieved (e.g., through use of the cover 90) when the solenoid 80 is mounted as shown in FIG. 3 versus the conventional arrangement of FIG. 6. In addition, the arrangement of FIG. 3 can be more compact than the conventional arrangement of FIG. 6, thereby facilitating more convenient and optimal disposition of the battery box 18 and associated components upon a vehicle. Furthermore, the arrangement of FIG. 3 can be more easily and inexpensively manufactured, and then installed upon a vehicle, than can the conventional arrangement of FIG. 6.

The foregoing description of embodiments and examples has been presented for purposes of illustration and description. It is not intended to be exhaustive or to limit the invention to the forms described. Numerous modifications are possible in light of the above teachings. Some of those modifications have been discussed, and others will be understood by those skilled in the art. The embodiments were chosen and described in order to best illustrate various embodiments as are suited to the particular use contemplated. It is hereby intended that the scope of the invention be defined by the claims appended hereto.

What is claimed is:

1. A battery box comprising:
a bottom wall;
a top wall generally parallel with the bottom wall and spaced from the bottom wall;
a first side wall extending from the bottom wall to the top wall;
a second side wall generally parallel with the first side wall, spaced from the first side wall, and extending from the bottom wall to the top wall;
a rear wall extending from the bottom wall to the top wall and extending from the first side wall to the second side wall, wherein the bottom wall, the top wall, the first side wall, the second side wall, and the rear wall together define a battery retention chamber having a front opening configured for passage of a battery; and
a first prong and a second prong each extending generally perpendicularly from the first side wall in a direction opposite the battery retention chamber, wherein the first prong is spaced from the second prong in a generally parallel and corresponding relationship, and wherein the first prong and the second prong are together configured to slidably receive a solenoid; and
a cover configured for selective attachment to the first side wall for covering the first prong, the second prong; wherein
the cover comprises tabs and the first side wall comprises slots configured to receive the tabs to facilitate attachment of the cover to the first side wall.

2. The battery box of claim 1 wherein each of the bottom wall, the top wall, the first side wall, the second side wall, the rear wall, the first prong, and the second prong comprises plastic.

3. The battery box of claim 1 further comprising a retention member configured for selective attachment to at least one of the bottom wall, the top wall, the first side wall, the second side wall, and the rear wall to facilitate selective securement of a battery within the battery retention chamber.

4. The battery box of claim 1 wherein the cover comprises rigid plastic and is substantially cup-shaped.

5. The battery box of claim 1 wherein at least one drain hole is provided in at least one of the first side wall, the second side wall, the bottom wall, and the cover.

6. The battery box of claim 1, wherein:
the first prong and the second prong extend from a proximal end to a distal end, the proximal end of each of the first prong and the second prong being adjacent to the first side wall; and
at least one of the first prong and the second prong comprises a lateral projection adjacent to the respective distal end.

7. The battery box of claim 6, wherein:
the top wall and the rear wall cooperate to define an aperture configured to facilitate passage of at least one finger of an operator for contacting and pushing a battery such that at least a portion of a battery passes from within the battery retention chamber and through the front opening; and
the first side wall is configured to at least substantially cover a first side surface of a battery, and the second side wall is configured to only partially cover a second side surface of a battery such that a second side surface of a battery may be contacted by a finger of an operator to facilitate pushing of a battery.

8. A battery box comprising:
a bottom wall;
a top wall spaced from the bottom wall;

a first side wall extending from the bottom wall to the top wall;

a second side wall spaced from the first side wall and extending from the bottom wall to the top wall, wherein the bottom wall, the top wall, the first side wall, and the second side wall together define a battery retention chamber having a front opening configured for passage of a battery; and a first prong and a second prong each extending laterally from the first side wall, wherein the first prong is spaced from the second prong, and wherein the first prong and the second prong are together configured to slidably receive an electrical actuator; and a cover configured for selective attachment to the first side wall for covering the first prong, the second prong, and an electrical actuator; wherein the cover comprises tabs and the first side wall comprises slots configured to receive the tabs to facilitate attachment of the cover to the first side wall.

9. The battery box of claim 8 wherein the top wall is generally parallel with the bottom wall, and the first side wall is generally parallel with the second side wall.

10. The battery box of claim 8 further comprising a rear wall extending from the bottom wall to the top wall and extending from the first side wall to the second side wall; wherein the rear wall defines, together with the bottom wall, the to wall, the first side wall, and the second side wall, the battery retention chamber.

11. The battery box of claim 8 wherein each of the bottom wall, the top wall, the first side wall, the second side wall, the first prong, and the second prong comprises plastic.

12. The battery box of claim 8 wherein the first prong and the second prong are generally parallel and correspond with one another and each extends generally perpendicularly from the first side wall in a direction opposite the battery retention chamber.

13. The battery box of claim 8 wherein the first prong and the second prong extend from a proximal end to a distal end, the proximal end of each of the first prong and the second prong being adjacent to the first side wall, and at least one of the first prong and the second prong comprises a lateral projection adjacent to the distal end.

14. The battery box of claim 8 further comprising a retention member configured for selective attachment to at least one of the bottom wall, the top wall, the first side wall, and the second side wall to facilitate selective securement of a battery within the battery retention chamber.

15. The battery box of claim 8 wherein the cover comprises rigid plastic and is substantially cup-shaped.

16. The battery box of claim 8 wherein at least one drain hole is provided in at least one of the first side wall, the second side wall, the bottom wall, and the cover.

17. A vehicle comprising:
a frame;
a battery;
an electrical actuator having a first mounting provision and a second mounting provision; and
a battery box attached to the frame and comprising:
a bottom wall;
a top wall spaced from the bottom wall;
a first side wall extending from the bottom wall to the top wall;
a second side wall spaced from the first side wall and extending from the bottom wall to the top wall, wherein the bottom wall, the top wall, the first side wall, and the second side wall together define a battery retention chamber having a front opening configured for passage of the battery;

a first prong and a second prong each extending laterally from the first side wall in a direction opposite the battery retention chamber, wherein the first prong is spaced from the second prong, and wherein the first prong and the second prong respectively interface the first mounting provision and the second mounting provision of the electrical actuator;

a rear wall; and a cover; wherein
the cover comprises tabs and the first side wall comprises slots configured to receive the tabs to facilitate attachment of the cover to the first side wall.

18. The vehicle of claim 17 further comprising a fender attached to the frame and extending adjacent to the top wall of the battery box.

19. The vehicle of claim 17 comprising an all terrain vehicle.

20. The vehicle of claim 17 wherein the cover is configured for covering the first prong, the second prong, and the electrical actuator when the cover is attached to the first side wall.

21. The vehicle of claim 20 wherein the electrical actuator comprises a solenoid.

22. The vehicle of claim 20 wherein the cover comprises rigid plastic and is substantially cup-shaped.

23. The vehicle of claim 17, wherein:
the rear wall defines, together with the bottom wall, the top wall, the first side wall, and the second side wall, the battery retention chamber;
the top wall is generally parallel with the bottom wall;
the second side wall is generally parallel with the first side wall;
the first prong and the second prong each extend generally perpendicularly from the first side wall in a direction opposite the battery retention chamber;
the electrical actuator comprises a solenoid;
each of the first prong and the second prong extends from a proximal end to a distal end, the proximal end of each of the first prong and the second prong being adjacent to the first side wall; and
at least one of the first prong and the second prong comprises a lateral projection adjacent to the respective distal end.

24. The vehicle of claim 23, wherein:
the battery comprises a first side surface and a second side surface, the first side surface being generally parallel with the second side surface;
the top wall and the rear wall cooperate to define an aperture configured to facilitate passage of at least one finger of an operator for contacting and pushing the battery such that at least a portion of the battery passes from within the battery retention chamber and through the front opening;
the first side wall at least substantially covers the first side surface of the battery; and
the second side wall only partially covers the second side surface of the battery such that the second side surface of the battery may be contacted by a finger of an operator to facilitate pushing of the battery.

25. The vehicle of claim 17, further comprising a retention member configured for selective attachment to at least one of the bottom wall, the top wall, the first side wall, the second side wall, and the rear wall to facilitate selective securement of the battery within the battery retention chamber.

* * * * *

UNITED STATES PATENT AND TRADEMARK OFFICE
CERTIFICATE OF CORRECTION

| | | |
|---|---|---|
| PATENT NO. | : 7,836,989 B2 | Page 1 of 1 |
| APPLICATION NO. | : 11/821965 | |
| DATED | : November 23, 2010 | |
| INVENTOR(S) | : Camas Reed et al. | |

It is certified that error appears in the above-identified patent and that said Letters Patent is hereby corrected as shown below:

Claim 1, Column 8, line 25, replace "the first prong, the second prong" with -- the first prong and the second prong --.

Signed and Sealed this
Twenty-sixth Day of April, 2011

David J. Kappos
*Director of the United States Patent and Trademark Office*